Patented Nov. 3, 1936

2,059,373

UNITED STATES PATENT OFFICE 2,059,373

MANUFACTURE OF PRESSED TUBES OR THE LIKE

Arthur Lloyd, Birmingham, England, assignor to Bakelite Limited, London, England, a British corporation No Drawing. Application May 20, 1930, Serial No. 454,193. In Great Britain June 15, 1929

8 Claims. (Cl. 154—2)

The present invention is for improvements in or relating to the manufacture of pressed tubes or the like of the type consisting of paper and a thermo-plastic binder which is rendered infusible by heat in a stoving operation. Paper coated and/or impregnated with synthetic resin products, particularly phenol and formaldehyde condensation products or the like have been used for making round tubes and rods for use in the electrical, textile and other industries. In the manufacture of these articles there are two known methods of hardening the binding medium. In the first method the coated or impregnated paper is rolled on to a heated former or mandrel by hand, by rotating the former or mandrel between heated rollers or by any other method by which the layers are tightly wound round the former. When the tube has been rolled to the desired diameter the assembled tube formed on the mandrel is stoved until the binding medium is finally hardened or polymerized. If desired a further coating of varnish is applied before or after this stoving process. In the second method the tube and former, after rolling is placed into a steel mold and treated or stoved under pressure until the binding medium is finally hardened or polymerized.

The round tubes made according to the first method are fairly easy to de-laminate and care has to be taken during the stoving that the temperature is not raised too rapidly, otherwise bubbles or pockets are formed on the surface and/or between the layers of the paper forming the tube. Those made according to the second method cannot be de-laminated but during pressing in the molds the laminations are often broken and the tube is thus weakened. The layers of paper are distorted and have to be cut to render the tube round afterwards.

The present invention is characterized by covering the tube or the like after forming and before the hardening process with a flexible binding, for example, tape, on its outer surface, and while so bound heating it until the thermoplastic material is converted into the infusible form.

The essential function of the binding is to support the tube or the like while pressure is applied from all sides by the expansion of the mandrel or former. During the stoving operation gases are evolved which may escape between the folds of the binding. Preferably, however, the binding is of a porous nature such as fabric in tape form which allows any gases to escape more readily.

One way in which the method of the invention may be carried into effect is as follows:—

The tubes after rolling are bound with tape or fabric in tape form, after the manner of a bandage and the whole assembly is then stoved. During the heating process the mandrel or former expands and pressure is exerted on the tube from inside by expansion. There is no distortion whatever and the layers or laminations are not broken. Further, any gases evolved escape through the tape and no bubbles or pockets are formed on or in the tube. Tubes made in this way are not subject to delamination and there are no weak points such as are formed in the case of the tubes molded in steel molds as above described. When tubes otherwise identical and treated under otherwise identical conditions are stoved according to the process of the invention on the one hand, and in steel molds on the other hand, the former are completely bonded together if the temperature is raised comparatively quickly, while the latter are not completely bonded but have pockets or air spaces between the layers due to rapid evolution of gases. The method hereinbefore described is applicable to laminated tubes and may be extended to rods wherein the laminations are built up round a central core of wood, metal or other suitable material, the central core then remaining in the finished article.

I claim:

1. A process for the manufacture of tubes and like articles of the type described which comprises forming on a mandrel a fibrous material and a resinous heat-hardenable material, covering the outer surface of the tube or the like after forming and before the hardening process with a flexible porous binding and while so bound heating it until the gases have escaped and the hardenable material is converted into the hard, infusible form.

2. In the manufacture of resin bonded articles in the form of tubes or the like bonded with a resinous heat-hardenable material, the steps which comprise applying a flexible porous enclosure thereto and thereafter hardening the bond.

3. In the manufacture of resin bonded articles in the form of tubes or the like, the steps which comprise applying thereto a flexible enclosure in a manner to permit the escape of gas through the enclosure and thereafter rigidifying the bond.

4. In the manufacture of bonded articles in the form of tubes or the like bonded with a heat hardenable resinous material, the steps which comprise applying thereto a porous enclosure and thereafter rendering the bond infusible.

5. In the manufacture of resin bonded articles in the form of tubes or the like, the steps which comprise applying thereto a flexible closure permeable by gas, applying an internal expanding pressure and rigidifying the bond.

6. In the manufacture of resin bonded articles in the form of tubes or the like, bonded with a heat-hardenable resinous material, the steps which comprise forming the article and setting the resinous bonding agent to a rigid condition under an internal expanding non-fluid pressure confined by a flexible enclosure porous to gas applied to the tube.

7. As an article of manufacture, a resin bonded tube or the like comprising a fibrous filler and a resinous bonding agent set to a final dense rigid condition under an internal expanding pressure confined by a porous binding adapted to prevent distortion and delamination of the tube and permit escape of gases during the rigidifying.

8. In the manufacture of articles in the form of dense rigid tubes or the like having laminations bonded with a heat-hardened resinous material, the steps which comprise providing a mandrel which expands under heat, tightly winding on said mandrel helical layers of sheet material containing the resinous bonding material in unhardened form and in such a condition that it gives off a gas during heat-hardening, preventing the formation of bubbles and pockets and preventing delamination of the sheet material during heating by binding porous tape around the sheet material, and expanding the mandrel and hardening and rigidifying the resinous bonding material by heating.

ARTHUR LLOYD.